July 30, 1940.　　　　L. F. SARNES　　　　2,209,421
GOVERNOR
Filed July 10, 1937　　　　2 Sheets-Sheet 1
FIG. 1.
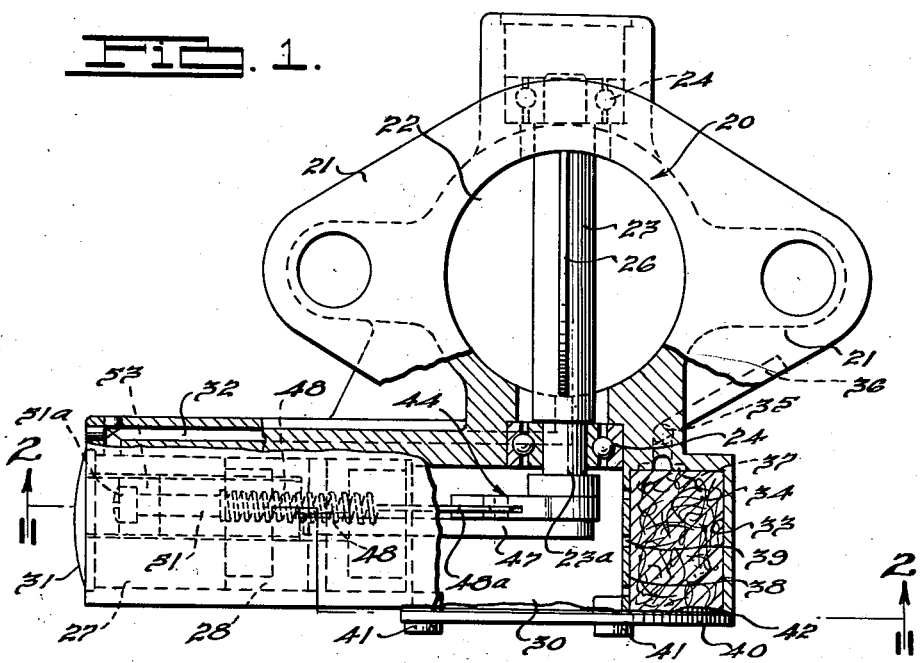
FIG. 2.
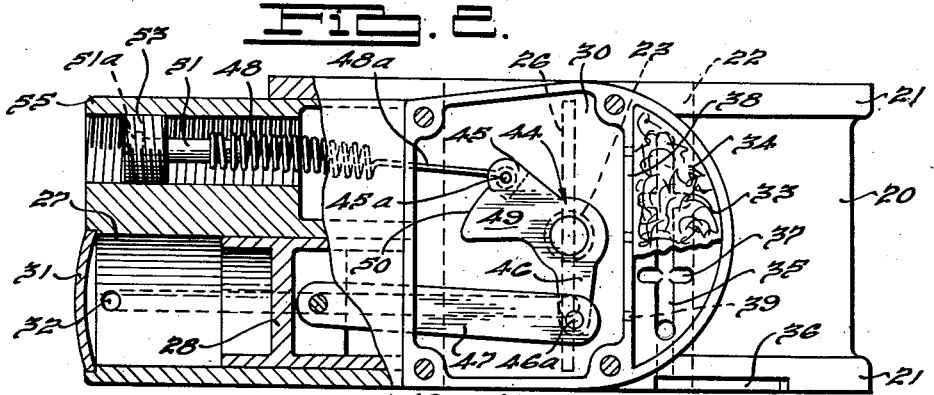
FIG. 3.
INVENTOR
Lowell F. Sarnes.
BY Duke, Calvert & Gray
ATTORNEYS July 30, 1940.　　　　　L. F. SARNES　　　　　2,209,421
GOVERNOR
Filed July 10, 1937　　　2 Sheets-Sheet 2
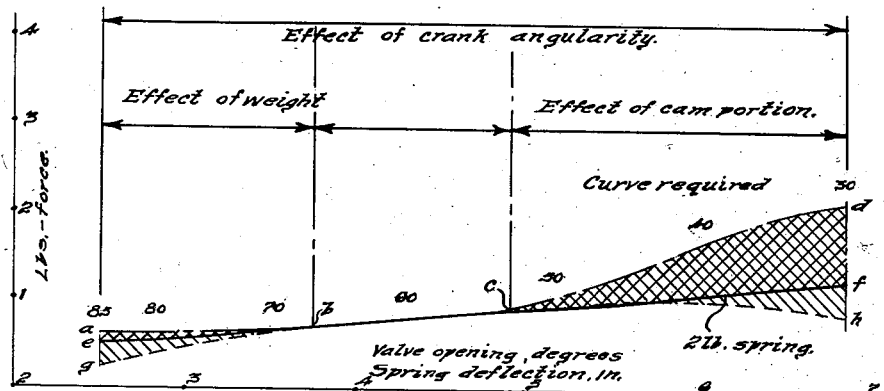
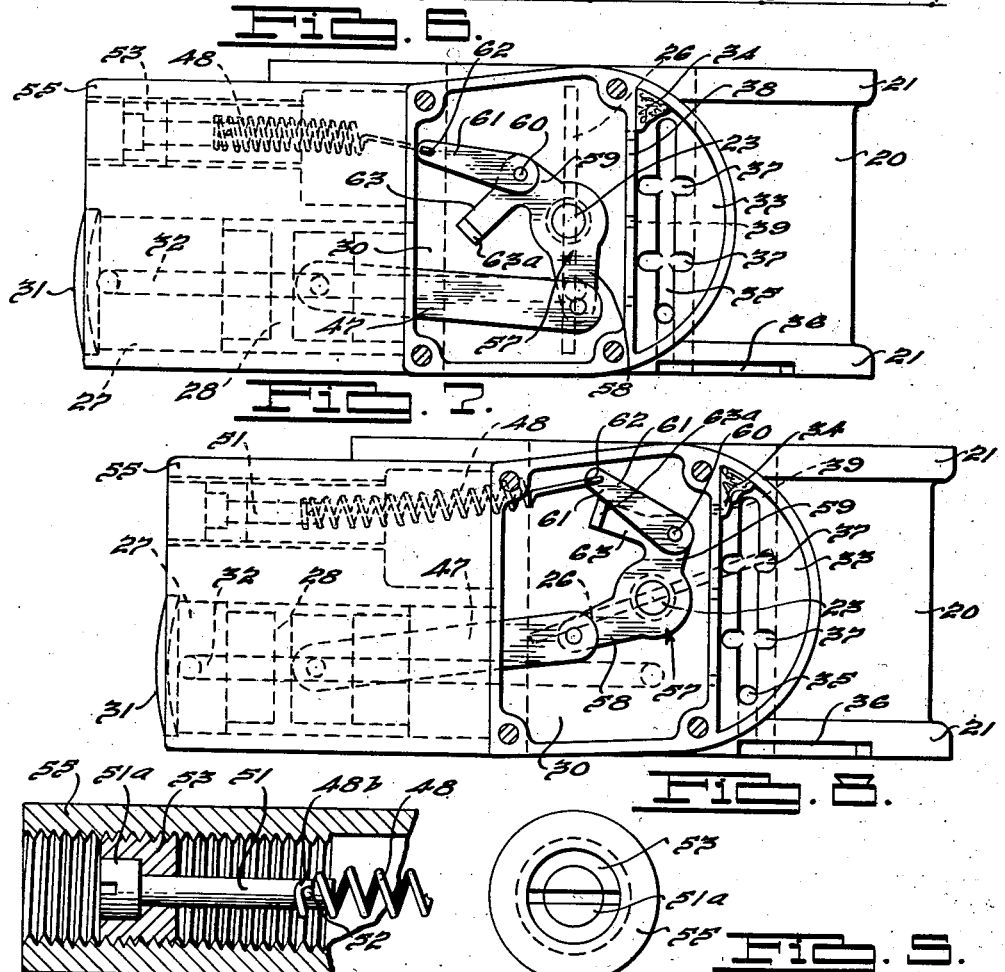
INVENTOR
Lowell F. Sarnes,
BY Dike, Calver & Gray
ATTORNEYS.

Patented July 30, 1940

2,209,421

UNITED STATES PATENT OFFICE 2,209,421

GOVERNOR

Lowell F. Sarnes, Detroit, Mich., assignor to Monarch Governor Company, Detroit, Mich., a corporation of Michigan Application July 10, 1937, Serial No. 153,036

10 Claims. (Cl. 137—153)

This invention relates to governors for internal combustion engines and more particularly to such governors in which the valve mechanism is actuated because of the difference between the static pressure in the intake manifold of the engine and the atmospheric pressure, or as it is often expressed in the art "is actuated by the manifold vacuum."

The vacuum in the intake manifold, and consequently the force produced thereby on the valve operating mechanism, varies in such a way that when plotted in a system of rectangular coordinates on the axis of ordinates, the degree of valve opening being plotted on the axis of abscissae, a curved line is produced. On the other hand, the resisting force, usually produced by a spring in deflection, exhibits straight line characteristics when similarly plotted. Providing means which would cooperate with the resisting spring in such a way and would so modify the force exerted thereby on the valve operating mechanism that the characteristic line of the spring coincides with the curve of the vacuum operated means substantially throughout the entire operative range of the valve, has proved to be a very difficult problem in this particular art. It must be noted at this point that balancing of the closing torque exerted on the valve shaft by the vacuum operated means and the opening torque exerted on the same shaft by the resisting means is a very important requirement for dependable governing action of the valve.

One of the objects of the present invention is to provide an improved engine governor having a butterfly governing valve of the balanced or unbalanced type, which valve is actuated in a closing direction by means of a piston subjected to the action of the manifold vacuum, this action being resisted in improved manner by spring means.

A further object of the invention is to provide an improved governor having a valve of the butterfly type, closing of which is resisted by means of a spring, the action of the spring being modified within predetermined portions of the operative range by the effect of the angularity of the valve shaft crank and by additional means changing the effective length of the crank and consequently the effective torque arm, whereby a characteristic curve of the spring is made to conform to the required curve characterizing the action of the vacuum operated valve closing means.

A still further object of the invention is to provide a governor of the foregoing character in which improved means are provided to adjust the force produced by the spring either by changing the amount of initial deflection of the spring or by changing the rate of deflection thereof, or by the combination of both.

It is an added object of the present invention to provide an improved governor of the above specified character, which is simple in construction and dependable in operation, and which is relatively cheap to manufacture.

Other objects and advantages of the invention will appear from the following description and appended claims when considered in connection with the accompanying drawings forming a part of this specification wherein like reference characters designate corresponding parts in the several views.

Fig. 1 is a top view of the governor constructed in accordance with one embodiment of the present invention.

Fig. 2 is a side view of the structure shown in Fig. 1, part of the structure being shown in cross section, the governing valve being shown in its fully open position.

Fig. 3 is a view similar in part to that of Fig. 2, the parts of the governor being shown in positions corresponding to the fully closed position of the governing valve.

Fig. 4 is a longitudinal sectional view illustrating the spring adjusting means constructed in accordance with the present invention.

Fig. 5 is an end view of the structure shown in Fig. 4.

Fig. 6 is a diagram plotted in a system of rectangular coordinates and showing the characteristic curve of the helical spring as well as the characteristic curve of the valve closing means.

Fig. 7 is a side view of a governor of modified construction, the front cover being removed, and the governing valve set in its fully open position.

Fig. 8 is a view similar in part to Fig. 7, the governing valve being shown in its fully closed position.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawings there are illustrated, by way of example, two governor devices constructed in accordance with the present invention. Referring to Figs. 1 to 5, inclusive, illustrating the first of said governor devices, the same comprises generally a body 20 made preferably as a die casting and provided with flanges 21 enabling the governor to be installed or interposed in the intake passage of an internal combustion engine between the carburetor and the intake manifold. In said body 20 there is provided a passage 22 through which the fuel mixture from the carburetor flows into the intake manifold and further on into the cylinders of the engine. Within said passage and transversely thereof there is operatively arranged a shaft 23 journalled in ball bearings 24 suitably installed in the governor body 20.

The governing valve 26 is secured to the shaft 23, and therefore rotation of the shaft 23 and the valve operates to restrict the passage 22 thus limiting the flow of the fuel mixture to the engine cylinders. The valve 26 is herein shown as of the balanced or approximately balanced butterfly type although it will be understood that the valve may be offset or unbalanced, if desired, to a more or less extent. Since there is practically no friction in the bearings 24, the valve 26 is free to move in the passage 22, and its exact position in the passage 22 is determined by the balance of forces or torques acting on the shaft 23. It can be easily understood in view of the foregoing that if the closing torque acting on the shaft 23 exceeds in its magnitude the torque tending to rotate the shaft 23 in the direction of opening the valve, the governing valve 26 will begin its closing movement and such movement will continue until the closing and the opening torques balance or until the governing valve 26 contacts the walls of the passage 22 or is otherwise limited at its fully closed position. On the other hand, if the opening torque is greater than the closing torque the valve 26 will begin its opening movement, and such movement will continue until the opening and the closing torques balance, or until the governing valve reaches its fully open position, such as shown in Figs. 1 and 2.

It is very important for proper governing of the engine that at or near the set speed to which the governor is adjusted the opening and the closing torques acting on the shaft 23 balance each other in substantially all positions of the governing valve 26 in order that an increase in the speed above the set speed will result in a closing movement of the valve 26. This particular requirement is often expressed in this art by the statement to the effect that the characteristic curve of the closing torque must coincide substantially at all points of its operative range with the characteristic curve of the valve opening torque. It can be easily understood that the characteristic curve for the closing torque available on the shaft 23 may be easily plotted by measuring the torque which is produced by the valve closing means in the different positions of the valve 23.

The means operating to exert a closing torque on the shaft 23 are, in the present embodiment of the invention, of the static pressure type and they depend for their operation upon the difference between the static pressure in the intake manifold and the atmospheric pressure. Said means are exemplified by a cylinder 27 integrally formed on the governor body, in which cylinder there is slidably fitted a piston 28. One end of said cylinder 27 opens into a chamber 30 formed in the governor body, while its other end is closed with a cover plug 31 and communicates with the vacuum zone of the intake manifold by means of a vacuum conduit 32. Adjacent the chamber 30 there is formed a sub-chamber 33 adapted to hold a filtering material 34 and communicating with the atmosphere by means of a conduit 35 which opens into the atmosphere by means of a slot 36 and into the air filter material of the chamber 33 by means of a plurality of branch conduits 37 thus providing sufficient area through which the air from the atmosphere may enter the sub-chamber 33. The wall 38 separating the chamber 30 from the sub-chamber 33 is provided with a plurality of holes 39. A detachable front cover 40 is adapted to be secured by screws 41 to the body and to cover the chamber 30. A gasket 42 is provided between the cover 40 and the body 20 for effecting a tight joint. When the front cover 40 is in place and the piston 28 moves toward its fully retracted position, the atmospheric air enters the chamber 30 through the atmospheric conduit 35 and will enter the chamber 30 after passing through the filter material 34. Thus formation of vacuum in the chamber 30 and accumulation of dust in said chamber are prevented.

The end 23a of the shaft 23 protrudes into the chamber 30 and a bell crank 44 is mounted on said end and restrained to rotate therewith. The bell crank 44 has two arms 45 and 46 which are set at an angle of about 135° to each other. It is to be understood that the present invention is not limited to the angle of 135°, and that any other suitable angle, preferably between 90° and 180°, answering the particular requirements of the governor may be employed without departing from the spirit of the present invention. The arm 46 is connected with the piston 28 by means of a connecting rod 47, and therefore, movements of the piston 28 in the cylinder 27 are transmitted to the bell crank 44 and cause rotation of the shaft 23. Thus when partial vacuum is created in the intake manifold of the engine, the same is transmitted into the cylinder 27 through the conduit 32 and it operates to draw the piston 28 toward its fully retracted position. Movement of the piston 28 causes rotation of the shaft 23, as mentioned, and closing of the valve 26. This condition is illustrated in Fig. 3. If, on the other hand, the degree of vacuum in the intake manifold of the engine decreases, such as may be the case when the torque at which the engine operates increases, there will be substantially no resistance to the movement of the piston 28 into its fully extended position, and the same may be easily effected with the aid of suitable means. The fully extended position of the piston 28 is illustrated in Fig. 2. The forces which are available at the point 46a of the arm 46 at different positions of the valve, when plotted on the axis of ordinates of a rectangular system of coordinates wherein the degree of the valve opening is plotted on the axis of abscissae, see Fig. 6, produce a curve passing through the points a, b, c and d of the diagram. It will now be seen in view of the foregoing that for the purpose of proper governing there should be available at some point, such as at the point 45a of the arm 45, forces which will give the same characteristic curve as that of the vacuum operated piston, it being understood that said forces must act in the direction opposite to those produced by the piston 28, which is to say they must act in the direction to open the valve 26. On the other hand, it is well appreciated in the art that a force produced by a deflected spring is directly proportional to the amount of the deflection thereof. If, therefore, the deflection of the spring employed in the present embodiment of the invention were proportional to the degrees of the valve opening, a straight line characteristic curve would be produced by the spring, such as the straight line e—f of the diagram illustrated in Fig. 6. If the spring is so selected that its characteristic curve is represented by the straight line e—b—c—f substantially coinciding with the required curve a—b—c—d only between the points b and c, it will be understood that between the points a and b and also between the points c and d the governing valve will not be in a balanced condition. It is clear therefore, that in the operative range between the points a and b near the wide open position of the valve and the points c and d near the closed position of the valve some additional means assisting the spring in its closing effort must be provided since the normal modifying effect of the crank angularity of the spring arm 45 operates to produce deviations of the characteristic straight line e—f of the spring as indicated by the curved lines g—b and c—h in the diagram, Fig. 6.

Means producing additional forces assisting the spring 48 near the wide open position of the valve so as to bring the spring line g—b into substantial coincidence with the vacuum line a—b are exemplified by a weight 49 provided on the arm 45. It can be easily understood from an examination of Figs. 2 and 3 that when the arm 45 is in the position indicated in Fig. 2, the downward force produced by the weight 49 is most effective to assist the spring 48, since in this position the effective torque arm is at its higher value. As the arm 45 moves in clockwise direction because of the rotation of the shaft 43 the effective torque arm of the weight 49 gradually decreases and in the condition illustrated in Fig. 3 it is equal to zero. This action of the weight 49 operates to increase the force produced by the spring and to bring the characteristic curve of the spring to the portion a—b of the curve a—b—c—d.

Means assisting the spring 48 near the closing range of the valve so as to bring the spring line c—h into substantial coincidence with the vacuum line c—d are exemplified in the present embodiment of the invention by a cam portion 50 formed on the arm 45 and cooperating with a flexible portion 48a of the spring 48. It will be understood from an examination of Figs. 2 and 3 that the diminishing effect produced by the angularity of the crank arm upon the effective torque arm of the spring arm 45 is counteracted by the cam portion 50 which is so shaped that as the valve 26 moves toward its closing position, the cam portion 50 comes into contact with the flexible portion 48a of the spring and the effective torque arm is progressively increased as the spring member 48a is wrapped over the cam 50, which is to say that the force produced by the spring acts upon a progressively increasing leverage. By a proper shaping of the cam portion 50 it is possible to bring the characteristic curve of the spring forces to the required portion c—d of the curve a—b—c—d which is a characteristic curve of the closing forces. By virtue of the above construction opening means are provided which balance the torque produced by the valve closing means substantially throughout the entire operative range of the governor valve.

An important feature of the present invention consists in the provision of means whereby both the original minimum deflection of the spring 48 and the rate of deflection of said spring per unit of load may be adjustably varied. The spring 48 is of the helical type and its anchored end fits over the spindle 51, a pin 52 secured to the spindle 51 passing between two adjacent coils of the spring. The end of the last coil is bent as at 48b, see Fig. 4, whereby separation of the spindle 51 and spring 48 is prevented. The spindle 51 is provided with a head 51a which fits into a countersunk hole provided in a threaded plug 53. Both the head 51a and the plug 53 are slotted, see Fig. 5, and therefore rotation of both the spindle 51 and the plug 53 may be effected either separately or simultaneously by means of a suitable screw driver or a special tool engaging the plug 53 only. The external thread of the plug 53 engages the internal thread of the cylindrical hole provided in the portion 55 of the governor body 20. If the spindle 51 alone is rotated with the aid of screw driver, the pin 52 travels along the helical path between the coils of the spring 48 toward the opposite end thereof. Since the angle of the helix is comparatively small, even when the spring 48 is stretched to its extreme deflection, the pin 52 always provides an anchoring point for the spring. Since, however, the pin 52 cannot be moved longitudinally with respect to the plug 53, its rotative movement and travel along the helical path with respect to the spring operates to draw a corresponding number of spring coils onto the left hand side thereof rendering said coils inoperative. Since in a helical spring with other conditions being constant the force is inversely proportional to the number of turns or coils, it can be easily understood that taking some of the coils out of the spring will change the rate of deflection of the spring, which is to say, will change the amount of the spring deflection per unit of force acting thereon, or inversely will change the force necessary to deflect the spring per required deflection or per unit of deflection.

If the plug 53 alone is rotated, which may be easily done with the aid of a wing piece, the spindle 51 and the pin 52 travel longitudinally of the portion 55, thus stretching or permitting a decrease of the amount of stretching or deflection of the spring. Such movement of the pin 52 will not, however, affect the number of active coils of the spring 48 and will not affect the rate of the deflection of the spring. However, such movement of the pin 52 changes the amount of original deflection of the spring.

Thus, means are provided to adjustably vary the amunot of the original or initial deflection of the spring as well as the rate of deflection thereof. It should be noted that the term "original deflection" or "initial load" as herein used means the load which is put on the spring by the adjustable anchoring means thereof, said term being used in contra-distinction to terms used to denote operative load put on the spring by the means exerting closing torque on the valve shaft. Said means can be used either separately or in combination. By proper manipulation of the spindle 51 and the plug 53 any desired adjustment of the spring 48 can be made. Thus any desired operation of the valve opening means can be effected and the same may be adjusted to any desired characteristic curve of the valve closing means.

Figs. 7 and 8 illustrate a modification of the above described governor in which the bell crank lever secured to the valve shaft has an articulated link connection between the spring arm and the spring. In this embodiment of the invention 57 indicates generally a bell crank corresponding to the bell crank 44 of the structure illustrated in Figs. 1 to 5 inclusive. The bell crank 57 has two arms, a lower or piston arm 58 pivotally connected to the piston rod 47 as in the previous embodiment and an upper or spring arm 59. The arm 59 is provided with a pin 60 on which there is pivotally mounted an additional link 61 to which link the spring 48 is attached as indicated at 62. An extension 63 is formed on the arm 59 and it extends substantially at a right angle to the axis of the arm 59. A tooth or lug 63a is provided on the extension 63, the same being adapted to contact the additional link 61 when the same is in a position such as illustrated in Fig. 8. When the valve 26 is in its fully open position as indicated in Fig. 7, the length of the crank on which the force exerted by the spring 48 acts is determined by the length of the line between the respective centers of the pin 60 and the shaft 23, the additional link 61 functioning as a mere extension of the spring. As the valve 26 moves toward its closed position, the extension 63 rises and the lug 63a comes into contact with the link 61, thereby converting this link into an angular extension of arm 59 and rigid therewith. When this point is reached, the length of the effective crank is determined by the length of the line extending from the center of the shaft 23 and the point 62. Thus in one sense two cranks of different lengths are provided on the bell crank 57, for connection with the spring, one, the short arm 59, effective at the beginning of the closing movement of the governing valve, and the other, the arm 59 and link 61 rigidly connected through extension 63, effective after said valve has travelled for a certain predetermined distance. Thus, the construction and operation of the governor of this embodiment may be such that the lug 63a on angular extension 63 will engage the link 61 at a point during the closing travel of the valve corresponding substantially to point c in the diagram of Fig. 6. At this point the solid connection between arm 59 and link 61 will in effect produce a single crank arm extending angularly from the valve shaft 23 to the spring connection 62. Therefore, during the remainder of the closing movement of the valve, such as approximately twenty-five degrees on the diagram, the effect of the angularity of this crank arm 59—61 will be to amplify the spring resistance similarly to the action of the cam 50 in the previous embodiment so as to produce a spring curve corresponding substantially to the portion c—d of the modified vacuum curve a—b—c—d.

It will be seen that in the wide open position of the valve the crank arm 46 or 58 extends preferably at substantially a right angle to the connecting rod 47 or the axis of travel of the piston. It is apparent that because of such an arrangement and owing to the reduction in the effective torque arm as the vacuum force increases with valve closure, a weaker spring may be chosen to resist the closing force and accordingly the slope of the spring tension will be lower, and in conjunction with the varying rate of decrease in the effective torque arm, it is possible to bring the spring tension curve into sufficiently close conformity with the vacuum curve in the portion between the point a and c of the diagram.

In some engines by changing the angle of the valve lever with respect to the piston axis to somewhat more than 90° at the wide open point, substantial conformity of the vacuum curve and the spring tension line up to point c in the diagram can be obtained without either a counterbalance weight or an auxiliary spring.

I claim:

1. A governor for an internal combustion engine, comprising a casing having a passage therein forming a portion of the engine intake conduit passage wherein partial vacuum is maintained by operation of the engine, a butterfly governing valve mounted in said casing and operatively disposed in said passage, a valve shaft upon which said valve is mounted for turning movement, a single vacuum actuated piston for moving the valve towards closed position, a spring resisting said movement, a bell crank having a pair of angularly related crank arms fixed to said shaft, one of said arms having a connection with the spring including means effective only during a final portion of the range of closing movement of the valve for progressively increasing the rate of spring deflection disproportionately with respect to the angular movement of the valve, and said other arm having a connection with the piston.

2. A governor for an internal combustion engine, comprising a casing having a passage therein forming a portion of the engine intake conduit passage wherein partial vacuum is maintained by operation of the engine, a butterfly governing valve mounted in said casing and operatively disposed in said passage, a shaft upon which said valve is mounted for turning movement, a single vacuum actuated piston for moving the valve toward closed position, a spring resisting said movement, and a bell crank having a pair of angularly related crank arms on said shaft, one of said arms being connected to the spring and the other of said arms being connected to the piston.

3. A governor for an internal combustion engine, comprising a casing having a passage therein forming a portion of the engine intake conduit passage wherein partial vacuum is maintained by operation of the engine, a butterfly governing valve mounted in said casing and operatively disposed in said passage, a shaft upon which said valve is mounted for turning movement, vacuum actuated means for moving the valve toward closed position, a spring resisting said movement, a bell crank having a pair of angularly related crank arms fixed to said shaft, one of said arms being connected to the spring and the other of said arms being connected to the vacuum actuated means, and a cam on said spring crank arm movable into effective position only during a final part of the closing range of travel of the valve for increasing the effective torque arm of said spring crank arm.

4. A governor for an internal combustion engine having an intake conduit passage and adapted to maintain in operation partial vacuum therein, said governor comprising a casing having a passage therein forming a portion of the engine intake conduit passage, a shaft journalled in said casing for rotative movement, a butterfly governing valve secured to said shaft and operatively disposed in said casing passage, a single vacuum actuated piston for moving the valve toward closed position, a spring resisting said movement, a bell crank having a pair of angularly related crank arms fixed to said shaft, one of said arms being connected to the spring and the other of said arms being connected to the piston, and weighted cam means formed on said spring crank arm for increasing the force of the spring urging the valve closed during the initial part of the closing range of the valve and movable into position only during a final part of the closing range of travel of the valve for increasing the effective torque arm of said spring crank arm.

5. A governor for an internal combustion engine having an intake conduit passage and adapted to maintain in operation partial vacuum therein, said governor comprising a casing having a passage therein forming a portion of the engine intake conduit passage, a shaft journalled in said casing for rotative movement, a butterfly governing valve secured to said shaft and operatively disposed in said casing passage, a single vacuum actuated piston for moving the valve toward closed position, a spring resisting said movement, a bell crank having a pair of angularly related crank arms fixed to said shaft, one of said arms being connected to the spring and the other to the piston, the angularity of said piston crank arm with respect to the axis of travel of the piston being such that the effective torque arm thereof decreases during travel of the valve from wide open toward closed position, and means associated with said spring crank arm for increasing the effective torque arm thereof.

6. A governor for an internal combustion engine having an intake conduit passage and adapted to maintain in operation partial vacuum therein, said governor comprising a casing having a passage therein forming a portion of the engine intake conduit passage, a shaft journalled in said casing for rotative movement, a butterfly governing valve secured to said shaft and operatively disposed in said casing passage, a single vacuum actuated piston for moving the valve toward closed position, a spring resisting said movement, a bell crank having a pair of angularly related crank arms on said shaft, one of said arms being connected to the spring and the other to the piston, the angularity of said piston crank arm with respect to the axis of travel of the piston being such that the effective torque arm thereof decreases during travel of the valve from wide open toward closed position, means cooperating with said spring crank arm for increasing the torque exerted on the valve shaft at the wide open position of the valve, the effect of said last means diminishing as the valve moves toward closed position, and means associated with said spring crank arm for progressively increasing the torque acting on the valve shaft during a final portion of the range of closing movement of the valve.

7. A governor for an internal combustion engine having an intake conduit passage and adapted to maintain in operation partial vacuum therein, said governor comprising a casing having a passage therein forming a portion of the engine intake conduit passage, a shaft journalled in said casing for rotative movement, a butterfly governing valve secured to said shaft and operatively disposed in said casing passage, means exerting closing torque on said shaft, a crank on the shaft, a single helical spring adapted to oppose said closing torque, one end of said spring being connected to said crank and its opposite end being anchored to the governor structure, means for moving said anchored end of the spring toward and away from said crank thereby changing the amount of deflection of said spring, means for adjustably changing the number of active coils of said spring thereby changing the deflection rate thereof, and a weight on said crank to produce an additional resisting torque on the shaft, which resistance decreases as the valve is moved from the open position, said torque being at its highest value in the fully open position of the valve.

8. A governor for an internal combustion engine having an intake conduit passage and adapted to maintain in operation partial vacuum therein, said governor comprising a casing having a passage therein forming a portion of the engine intake conduit passage, a shaft journalled in said casing for rotative movement, a butterfly governing valve secured to said shaft and operatively disposed in said casing passage, means for exerting closing torque on said shaft, a crank on said shaft, an internally threaded portion formed on said body, a rotatable externally threaded plug in said portion, a rotatable spindle journalled in said plug and constrained to move with said plug longitudinally of said portion, an anchoring stud at said spindle, a single helical spring anchored by its one end at said spindle and adapted to exert valve opening torque on the shaft, said stud adapted to follow the helix of said spring, a flexible member secured to the opposite end of the spring and connecting the same to the crank, and a cam portion on the crank cooperating with said flexible member to counteract the effect of angularity of said crank.

9. A governor for an internal combustion engine having an intake conduit passage and adapted to maintain in operation partial vacuum therein, said governor comprising a casing having a passage, a governing valve rotatively arranged in said passage and adapted to be moved toward its closed position by operation of the partial vacuum in said passage, a spring resisting said movement, a crank arm operably connected with said valve and having an outer end connected to said spring, said arm adapted during initial portion of the range of closing movement of said valve to vary by the effect of its angularity the effective arm through which said spring acts on said valve, and cam means on said arm effective only during the final portion of the range of the closing movement of the valve to increase the length of said effective arm.

10. A governor for an internal combustion engine having an intake conduit passage and adapted to maintain in operation partial vacuum therein, said governor comprising a casing having a passage, a governing valve rotatively arranged in said passage and adapted to be moved toward its closed position by operation of the partial vacuum in said passage, a spring resisting said movement, a crank arm rotatable with said valve and having an outer end connected to said spring, said arm adapted during initial portion of the range of closing movement of said valve to vary by the effect of its angularity the effective arm through which said spring acts on said valve, a link hinged to the end of said crank arm and connected to said spring, and a member on said crank arm adapted to engage and support said link near the final portion of the range of the closing movement of said valve to cause said link to operate as a part of the crank and to increase the length of said effective arm.

LOWELL F. SARNES.